Patented Mar. 20, 1928.

1,662,872

UNITED STATES PATENT OFFICE.

SIDNEY THORNLEY, OF BLACKLEY, MANCHESTER, ENGLAND, ASSIGNOR TO BRITISH DYESTUFFS CORPORATION LIMITED, OF MANCHESTER, ENGLAND.

ACYLAMINO FLAVANTHRONES AND PROCESS OF MAKING SAME.

No Drawing. Application filed September 3, 1927, Serial No. 217,540, and in Great Britain September 2, 1926.

Amino derivatives of certain organic compounds have been prepared by the action of hydroxylamine in the presence of sulphuric acid, usually with the addition of a metallic salt. New vat dyes have also been synthesized by the action of hydroxylamine on dibenzanthrone.

We have now found that by treating flavanthrone in a similar manner with hydroxylamine or salts thereof, a new vat dye is obtained, an amino lavanthrone, which dyes cotton from a hydrosulphite vat in green shades. The new dye may be converted into further new vat dyes by treating it with acylating agents.

The following are examples of the method of carrying out my invention, but are intended to illustrate and not limit the invention, the particular details of which may be varied widely. For example, metals or other metallic salts may be used instead of ferrous sulphate in Example 1. Also, the solution obtained by the electrolytic reduction of nitric acid may be used instead of pure hydroxylamine. Further, in Example 2 the treatment of the acylated dyestuff with sodium hypochlorite is optional.

Example 1.

20 parts of flavanthrone are dissolved by stirring into 400 parts of sulphuric acid, 66° Bé.; 24 parts of ferrous sulphate crystals are added, followed, after cooling, by the gradual addition of 10 parts of hydroxylamine hydrochloride. The temperature is raised to 165° C. and maintained at 160–165° C., with stirring, for 2 hours. The reaction mixture is cooled, poured into 3000 parts of water, and the whole stirred. After separation by filtration, the residual amino flavanthrone is washed with water until free from acid, and dried.

Example 2.

10 parts of the dried product of Example 1, 150 parts of nitrobenzene, and 36 parts of benzoyl chloride are heated with stirring at 170° C. for 1½ hours. Afterwards the temperature is raised to 210° C. and maintained at 205–210° C. for 2 hours. The reaction mixture is cooled, 280 parts of denatured alcohol added, stirred for an hour, and filtered. The residue is washed with alcohol until free from nitrobenzene, and is then boiled with 200 parts of water and 25 parts of sodium hypochlorite (15% available chlorine) for 30 minutes, followed by the addition of 10 parts of glacial acetic acid and a further 15 minutes boiling. After separation by filtration, the residue is well washed with water and dried.

The product thus obtained is a new benzoylamino flavanthrone, it dyes cotton a brown shade from a hydrosulphite vat and is further characterized by the following properties: It is soluble in sulphuric acid giving a reddish orange solution and in sulphuric acid and boric acid giving a reddish orange solution, and on treatment with hydrolyzing agents splits off benzoic acid and regenerates an amino flavanthrone. Its chemical composition is indicated by the following formula:

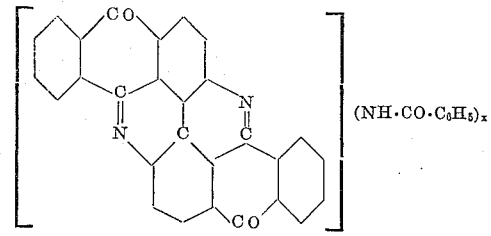

In place of the benzoyl chloride in this example, other acid halides may be used and other acyl-amino-flavanthrone obtained. Amongst those giving valuable products may be mentioned anisoyl chloride, o- and m-methoxy-benzoyl-chlorides, p-etho xybenzoyl chloride, m-toluyl chloride, o-chlorobenzoyl chloride, p-nitro- and 3:5-dinitro-benzoyl chlorides, p-benzoylbenzoyl chloride, alpha-naphthoyl chloride, furoyl chloride

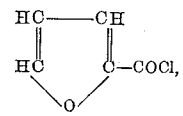

etc.

The said acyl-amino-flavanthrones are characterized by the following properties: They yield blue vats by reduction with hydrosulphite and dye cotton from a vat giving shades ranging from brown to yellowish brown. On treatment with hydrolyzing agent the acyl group is split off and an amino flavanthrone is recovered.

What I claim and desire to secure by Letters Patent is:—

1. Acyl-amino-flavanthrones which yield a dye vat on reduction with sodium hydrosulphite solution and dye cotton from a vat in shades brown to yellowish brown and which on hydrolysis give amino-flavanthrones.

2. As a new material useful as a vat dyestuff, benzoyl-amino-flavanthrone, said material dyeing cotton a brown shade from the hydrosulphite vat, being soluble in sulphuric acid and in sulphuric acid in the presence of boric acid, with production of a reddish orange solution and on treatment with hydrolyzing agents splitting off benzoic acid and regenerating amino-flavanthrone.

3. The process for the manufacture of vat dyes which comprises treating flavanthrone with hydroxylamine and acylating the resulting amino-flavanthrone.

4. The process for the manufacture of vat dyes which comprises treating flavanthrone with hydroxylamine and then benzoylating the amino-flavanthrone.

In testimony whereof I have signed my name to this specification.

SIDNEY THORNLEY.